(12) United States Patent
Okuyama et al.

(10) Patent No.: US 8,857,836 B2
(45) Date of Patent: Oct. 14, 2014

(54) SUB FRAME STRUCTURE OF AUTOMOTIVE VEHICLE

(71) Applicant: Mazda Motor Corporation, Hiroshima (JP)

(72) Inventors: Kazuhiro Okuyama, Hiroshima (JP); Fumitaka Andou, Hatsukaichi (JP); Masaya Hiramatsu, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/142,492

(22) Filed: Dec. 27, 2013

(65) Prior Publication Data

US 2014/0183834 A1 Jul. 3, 2014

(30) Foreign Application Priority Data

Dec. 28, 2012 (JP) ................................. 2012-286638

(51) Int. Cl.
*B62D 21/11* (2006.01)

(52) U.S. Cl.
CPC ..................................... *B62D 21/11* (2013.01)
USPC .................................................. 280/124.109

(58) Field of Classification Search
CPC ................................ B62D 21/11; B62D 21/02
USPC ............ 280/124.109, 124.134, 124.135, 781; 180/311, 312
See application file for complete search history.

(56) References Cited

U.S. PATENT DOCUMENTS

| 5,280,957 A * | 1/1994 | Hentschel et al. ............. 280/788 |
| 5,374,081 A * | 12/1994 | Schoderer et al. ............. 280/788 |
| 5,562,308 A * | 10/1996 | Kamei et al. ................... 280/788 |
| 6,866,295 B2 * | 3/2005 | Ziech et al. .................... 280/785 |
| 7,946,377 B2 * | 5/2011 | Frasch et al. ................... 180/312 |
| 7,959,170 B2 * | 6/2011 | Mauz ...................... 280/124.135 |
| 8,641,066 B2 * | 2/2014 | Kudla et al. ............. 280/124.109 |
| 2002/0140220 A1 * | 10/2002 | Tatsumi et al. ................ 280/781 |
| 2009/0322050 A1 * | 12/2009 | Ogawa et al. .......... 280/124.109 |
| 2012/0043736 A1 * | 2/2012 | Okamoto et al. ...... 280/124.135 |

FOREIGN PATENT DOCUMENTS

JP 2008-114652 A 5/2008

* cited by examiner

*Primary Examiner* — Paul N Dickson
*Assistant Examiner* — Robert A Coker
(74) *Attorney, Agent, or Firm* — Studebaker & Brackett PC (57) ABSTRACT

A sub frame attached to a vehicle-body rear portion from below comprises a pair of right-and-left side members and a front cross member which interconnects substantially respective central portions, in a vehicle longitudinal direction, of the side members. As attachment portions for attaching lower links, there are provided a central attachment portion which is provided at an interconnection portion between the side member and the front cross member, a front attachment portion which is provided at the side member at a position located in front of the interconnection portion, and a rear attachment portion which is provided at the side member at a position located in back of the interconnection portion. Thereby, a sub frame structure of an automotive can be superior in the light weight, ensuring the support rigidity of the suspension links.

14 Claims, 11 Drawing Sheets

SUB FRAME STRUCTURE OF AUTOMOTIVE VEHICLE

BACKGROUND OF THE INVENTION

The present invention relates to a sub frame structure of an automotive vehicle.

In an automotive vehicle, a sub frame is attached to a vehicle-body rear portion and suspension links and other components are attached to the sub frame. In general, the sub frame to which the suspension links are previously assembled is attached to the vehicle-body rear portion from below.

Increasing the rigidity of a vehicle body where the suspension links are attached can generally improve the driver's feelings of responsibility and rigidity when the automotive vehicle makes a turn. Japanese Patent Laid-Open Publication No. 2009-114652 proposes that a brace member is additionally provided to increase the rigidity of the vehicle body where the suspension links are attached.

Improving the fuel economy has been recently desired additionally for the rigidity improvement. Accordingly, it is desirable that the sub frame is made properly light, ensuring the necessary rigidity thereof. The structure disclosed in the above-described patent document is superior in the rigidity improvement, but inferior in the light weight because of the brace member additionally provided as a reinforcing member.

Moreover, the sub frame to which the suspension links are attached requires the rigidity for supporting components properly against an external force transmitted from a wheel. Especially, in a case in which the number of suspension links is large like a multilink type of suspension, the number of attachment portions for attaching the suspension links which are provided at the sub frame becomes large as well. Accordingly, if each of the attachment portions for the suspension links is reinforced, the light weight of the sub frame may not be obtained.

SUMMARY OF THE INVENTION

The present invention has been devised in view of the above-described matters, and an object of the present invention is to provide a sub frame structure of an automotive which can be superior in the light weight, ensuring the support rigidity of the suspension links.

According to the present invention, there is provided a sub frame structure of an automotive vehicle, in which a sub frame to support a suspension device for a wheel at a vehicle body is connected to a pair of right-and-left rear frames, via fixing means, which have a closed cross section and extend in a vehicle longitudinal direction below a vehicle floor which includes a vehicle-compartment floor portion, a kick-up portion rising upward from a rear end of the vehicle-compartment floor portion, and a rear panel portion extending rearward from an upper end of the kick-up portion, the sub frame comprising a front cross member extending in a vehicle width direction and connected to the pair of rear frames located below the rear panel portion via fixing means at right-and-left both end portions thereof, the front cross member having a central portion which is configured to project downward in substantially a V shape in an elevational view, a rear cross member extending in the vehicle width direction at a position located in back of the front cross member and connected to the pair of rear frames located below the rear panel portion via fixing means at right-and-left both end portions thereof, a pair of right-and-left side members extending substantially in the vehicle longitudinal direction below the front cross member, respective front end portions of which are connected to the pair of rear frames located below around the kick-up portion via fixing means and respective rear end portions of which are joined to the rear cross member, and a pair of right-and-left connecting brackets extending substantially in a vehicle vertical direction and interconnecting respective substantially central portions, in the vehicle longitudinal direction, of the pair of side members and right-and-left slant portions of the front cross member which form part of the V-shaped central portion and are located above the pair of side members, wherein at the pair of connecting brackets are respectively provided a pair of attachment portions for attaching a specified link among plural suspension links constituting the suspension device which is arranged the closest to a center of the wheel.

According to the present invention described above, the relatively-large external force inputted from the wheel via the specified link arranged the closest to the wheel center can be received at the attachment portion provided at the connecting bracket which is located at a high-rigidity interconnection portion between the side member and the front cross member. Thereby, the inputted external force can be transmitted to the rear frame by being properly dispersed to the side member and the front cross member, so that the relatively-large external force inputted from the wheel can be properly supported at the sub frame. Thus, the sub frame structure of an automotive according to the present invention can be superior in the light weight, ensuring the support rigidity of the suspension links.

Herein, it may be preferable that the connecting bracket be made of a metal plate which is formed such that the connecting bracket has a closed cross section, an outward end portion of which be comprised of a pair of flange portions which open outward in the vehicle width direction, and the pair of flange portions constitute the attachment portion such that a vehicle-body side end portion of the specified link is supported between the pair of flange portions. Thereby, the above-described attachment portion for the specified link can be formed simply and integrally with the connecting bracket interconnecting the front cross member and the side member.

Further, it may be preferable that the connecting bracket be configured to have substantially a triangular shape in the elevational view. Thereby, the connecting bracket can be configured properly for the light weight.

Also, it may be preferable that the pair of side members be arranged obliquely relative to the vehicle longitudinal direction in a plan view such that a distance between the both front end portions thereof is greater than that between the both rear end portions thereof. Thereby, an appropriate shape of the side members (in the plan view) can be provided for the side members equipped with plural attachment portions for the plural suspension links.

Moreover, it may be preferable that the side member be configured to curve in a side view, projecting downward. Thereby, likewise, an appropriate shape of the side members (in the side view) can be provided for the side members equipped with plural attachment portions for the plural suspension links.

Further, it may be preferable that the connecting of the both end portions of the front cross member, the both end portions of the rear cross member, and the respective front end portions of the pair of side members to the pair of rear frames be comprised of direct connecting without a resilient member. Thereby, the strength of the above-described connection can be increased, so that the responsibility of the vehicle can be improved and the vehicle-body rigidity can be further increased.

Meanwhile, in a case in which the suspension device is a multilink type of rear suspension device equipped with five suspension links for a single rear wheel, it may be preferable that the attachment portion provided at the connecting bracket be provided for attaching a front lower lateral link which is a forward-positioned link between two lower lateral links which are arranged below the center of the wheel, extending substantially in the vehicle width direction. Thereby, the sub frame structure according to the present invention which is suitable to the multilink type of rear suspension device equipped with the five suspension links can be provided In this case, it may be preferable that an attachment portion for attaching a rear lower lateral link which is a rearward-positioned link between the two lower lateral links be provided at a portion of the side member which is located near the rear end portion joined to the rear cross member. It may be also preferable that an attachment portion for attaching a trailing link among the five suspension links which is arranged below the center of the wheel, extending obliquely relative to the vehicle width direction, be provided at a portion of the side member which is located near the front end portion of the side member. It may be also preferable that an attachment portion for attaching an upper lateral link among the five suspension links which is arranged above the center of the wheel, extending substantially in the vehicle width direction, be provided at the end portion of the front cross member. It may be also preferable that an attachment portion for attaching a leading link among the five suspension links which is arranged above the center of the wheel, extending obliquely relative to the vehicle width direction, be provided at the end portion of the rear cross member.

Additionally, it may be preferable that the suspension device be a rear suspension device for suspending a rear wheel as a drive wheel, and a differential gear box which constitutes part of a drive device of driving the rear wheel be arranged in a space above the V-shaped central portion of the front cross member. Thereby, the differential gear box can be arranged properly by utilizing the space above the V-shaped central portion of the front cross member.

The sub frame according to the present invention is applicable to an open car type of automotive vehicle as well. In this case, the rigidity of a vehicle-body rear portion of the open car type of automotive vehicle, which may not increase its vehicle-body rigidity properly by using a roof, can be improved effectively, Other features, aspects, and advantages of the present invention will become apparent from the following description which refers to the accompanying drawings.

DETAILED DESCRIPTION OF THE INVENTION

Hereinafter, a preferred embodiment of the present invention will be described specifically referring to the accompanying drawings.

Figure 3:
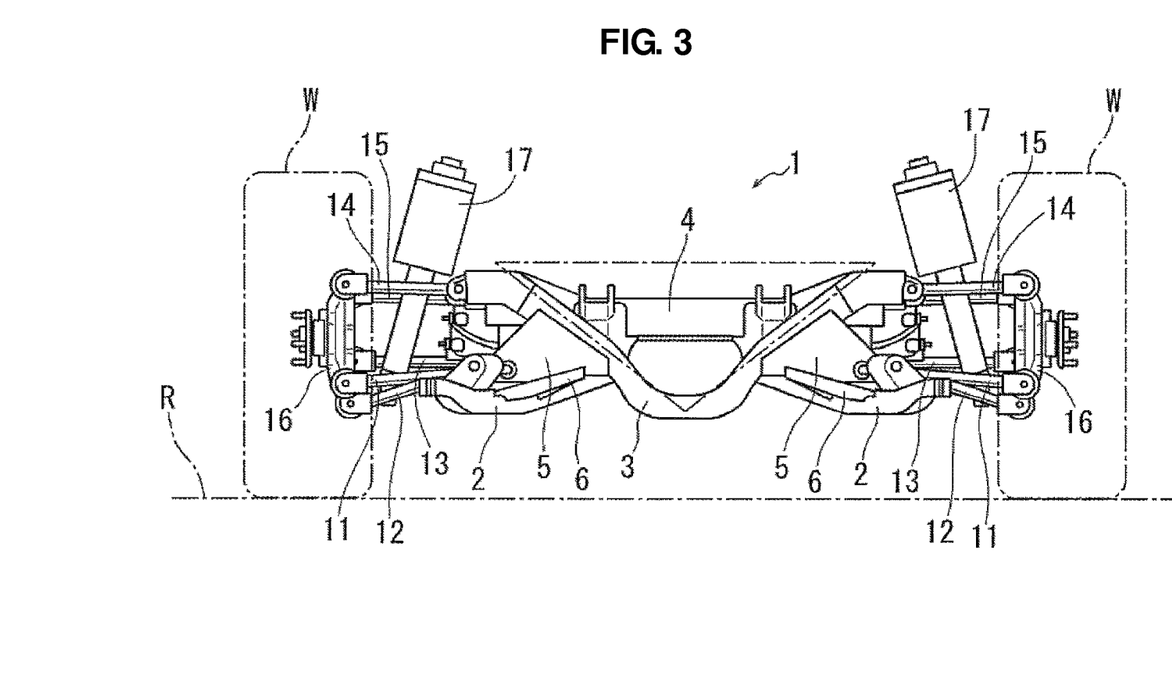
FIG. 3 is an elevational view of the sub frame structure shown in FIG. 1, when viewed from the front.
Figure 4:
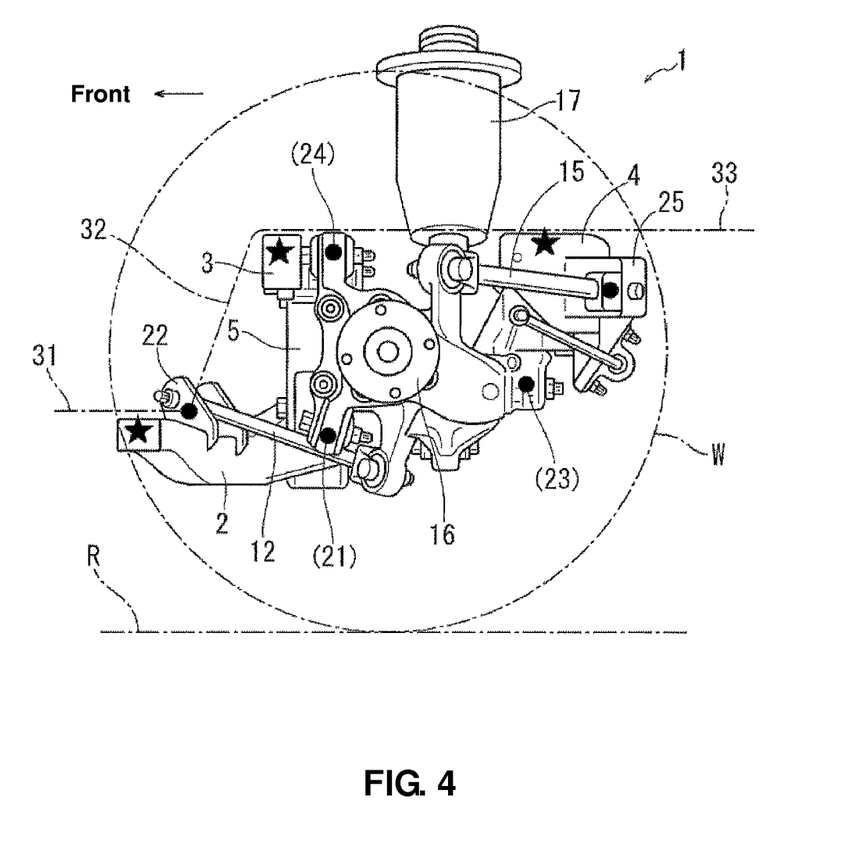
FIG. 4 is a side view of the sub frame structure shown in FIG. 1, when viewed from the left.
Figure 5:
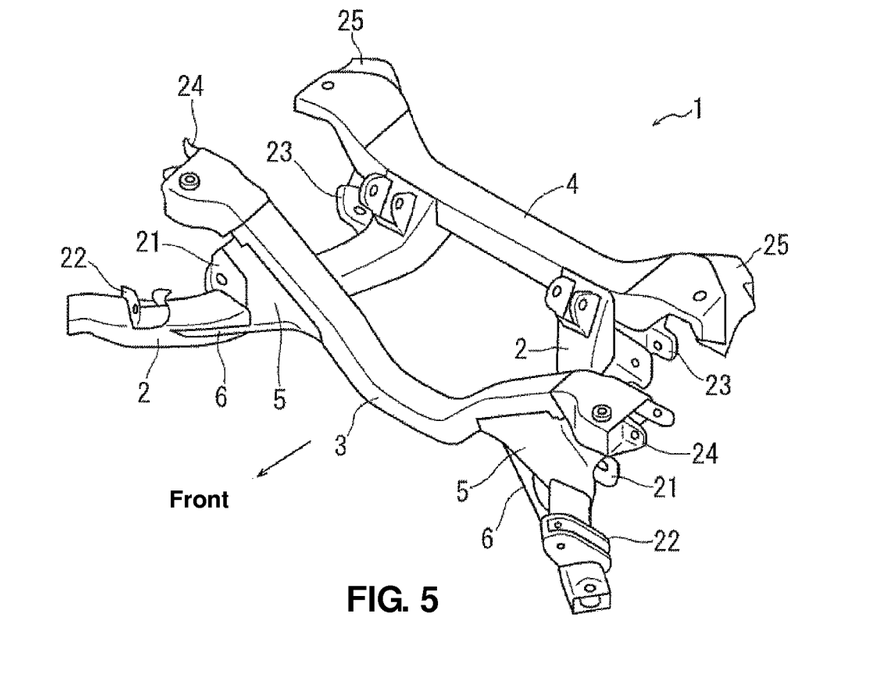
FIG. 5 is a perspective view showing the sub frame structure shown in FIG. 1, removing links and others.
Figure 6:
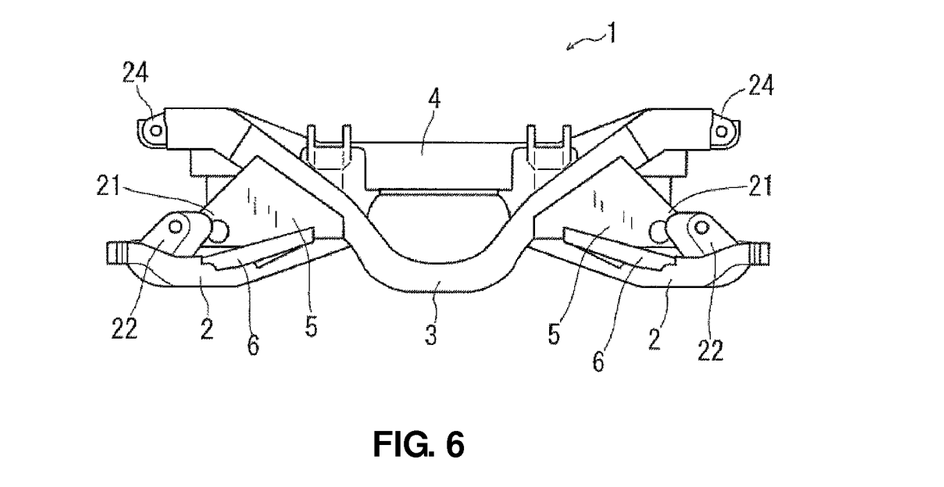
FIG. 6 is an elevational view of the sub frame structure shown in FIG. 5, when viewed from the front.
Figure 7:
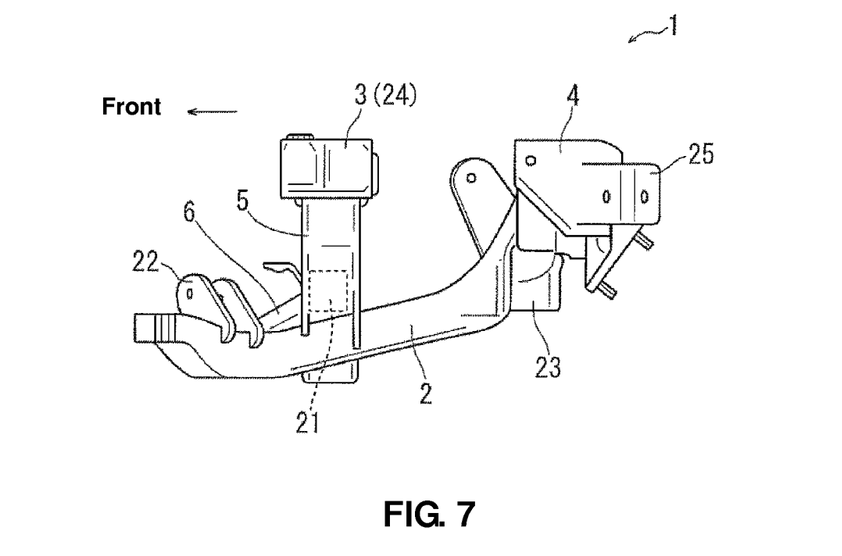
FIG. 7 is a side view of the sub frame structure shown in FIG. 5, when viewed from the left.

FIGS. 1-4 show a sub frame 1 of the present invention in a state in which suspension related components, such as suspension links, are assembled. FIGS. 5-7 show the sub frame 1 in a state in which the suspension related components are removed. In the figures, reference character W denotes a wheel and reference character R denotes a road surface.

In FIGS. 1-7, reference character 2 denotes a pair of right-and-left side members, reference character 3 denotes a front cross member, reference character 4 denotes a rear cross member, and reference character 5 denotes a pair of right-and-left connecting brackets. These side members 2, front cross member 3, rear cross member 3 are made from metal (Fe-based metal or light metal, such as aluminum alloy, for example) and formed such that these have a closed cross section, respectively.

Figure 1:
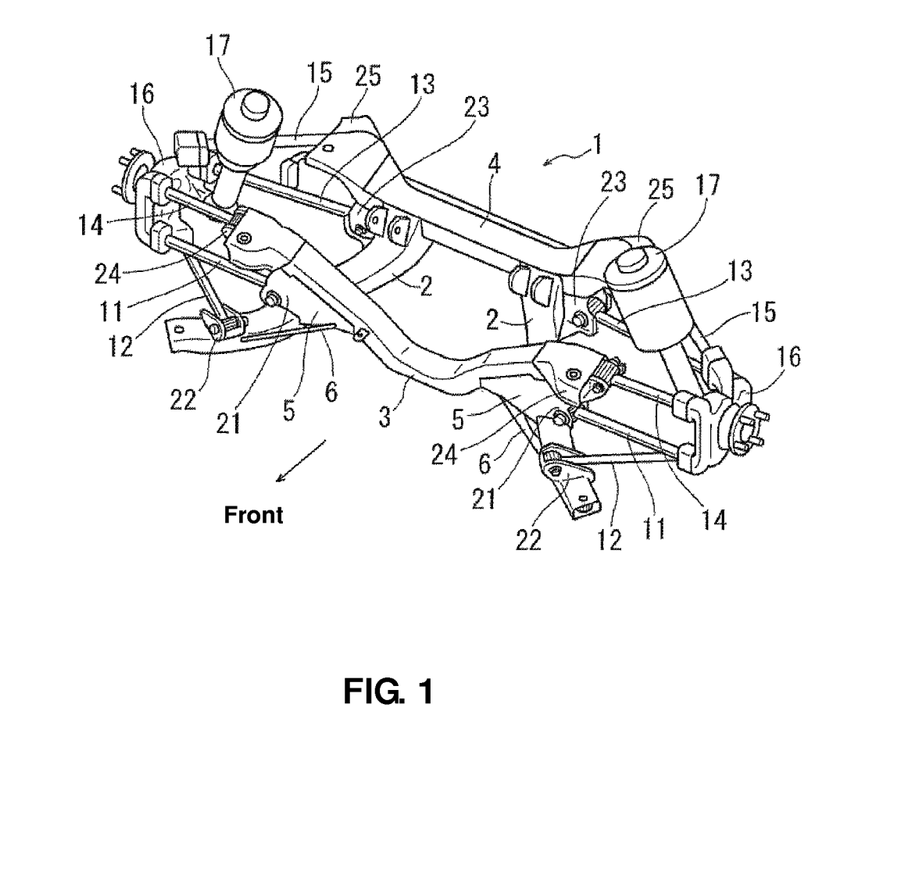
FIG. 1 is a perspective view showing an embodiment of a sub frame structure to which the present invention is applied.
Figure 2:
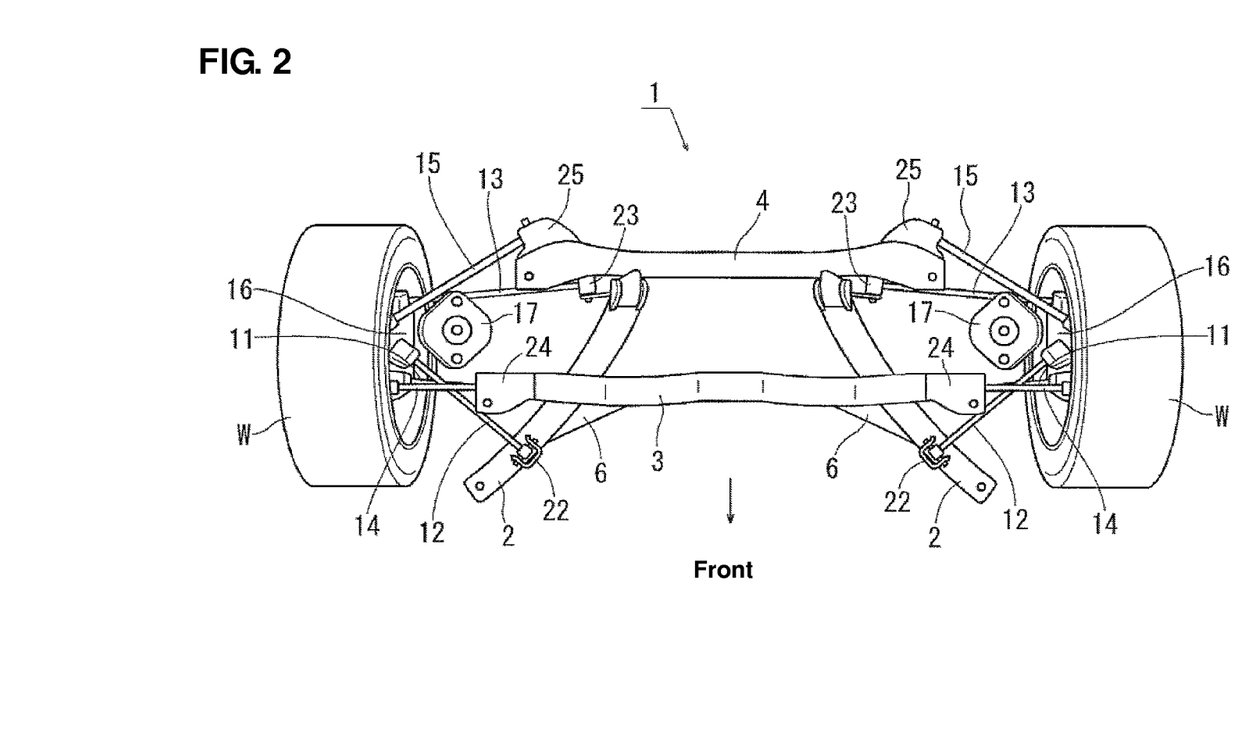
FIG. 2 is a plan view of the sub frame structure shown in FIG. 1, when viewed from above.

The right-and-left side members 2 are arranged obliquely relative to a vehicle longitudinal direction in a plan view such that a distance between their both front end portions is greater than that between their both rear end portions. Further, each of the side members is configured to curve slightly in a side view, projecting downward.

Figure 8:
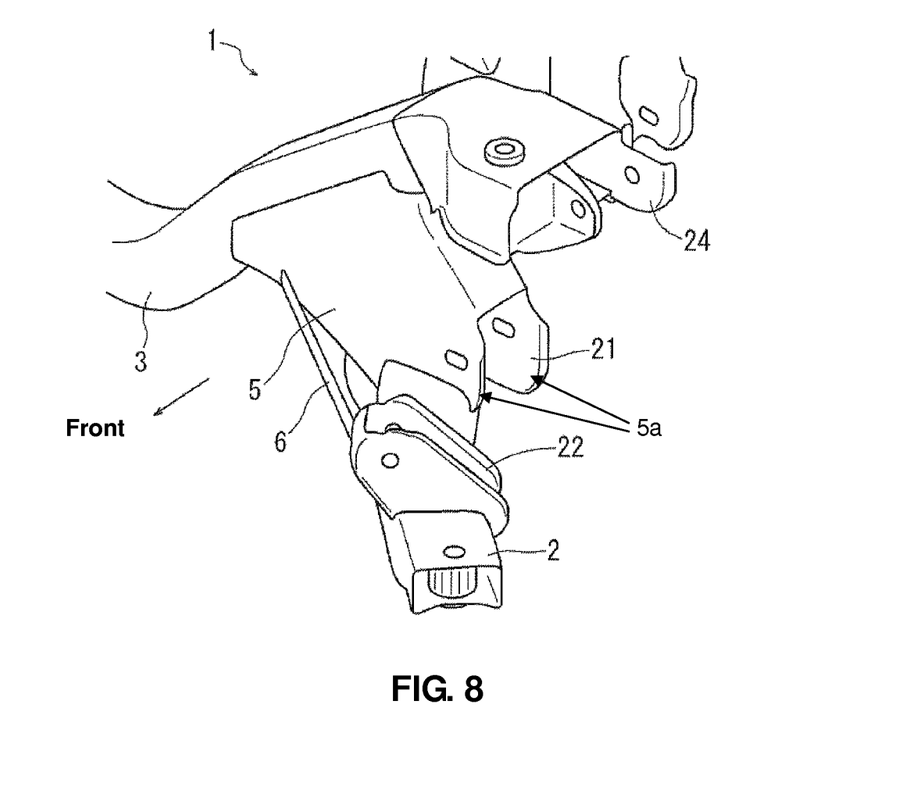
FIG. 8 is a major-part perspective view showing a front-side portion of an interconnection portion between a side member and a front cross member.
Figure 9:
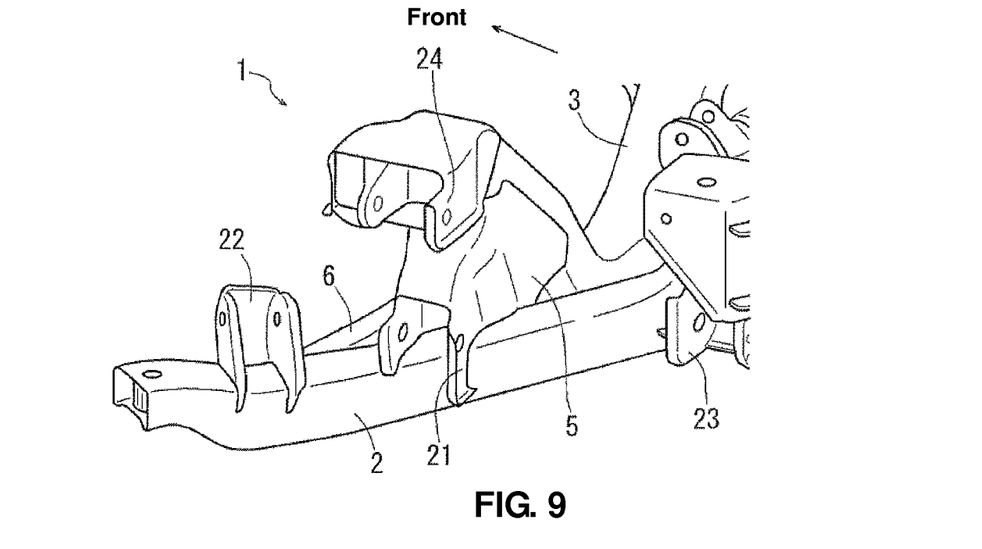
FIG. 9 is a major-part perspective view showing a rear-side portion of the interconnection portion between the side member and the front cross member.
Figure 10:
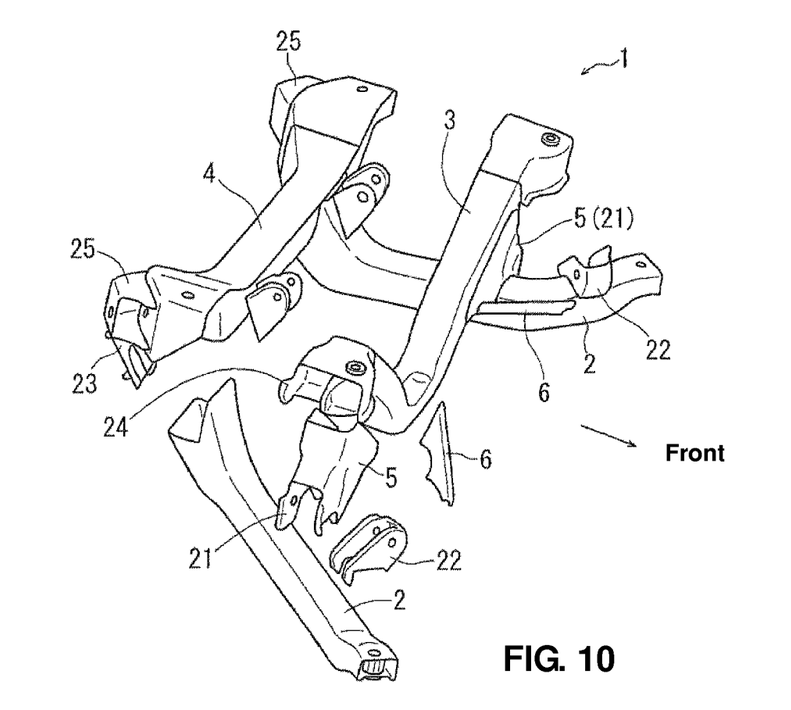
FIG. 10 is an exploded perspective view of the sub frame structure shown in FIG. 5.

The front cross member 3 interconnects the right-and-left side members 2 substantially at a central portion, in a vehicle longitudinal direction, of each of the side members 2, more specifically at a position which is located slightly forward from the central portion, in the vehicle longitudinal direction, of each of the side members 2. More specifically, the front cross member 3 has a central portion which is configured to project downward in substantially a V shape in an elevational view, and both end portions of the front cross member 3 are located at a higher level than the side members 2 (see FIGS. 3 and 6, particularly). Respective substantially-central portions, in the vehicle longitudinal direction, of the pair of side members 2 and right-and-left slant portions of the front cross member 3 which form part of the above-described V-shaped central portion are interconnected by the pair of right-and-left connecting brackets 5 which extend substantially in a vehicle vertical direction. Herein, the connecting bracket 5 is made from metal (Fe-based metal or light metal, such as aluminum alloy, for example), and it may be preferably formed in substantially a triangular shape in the elevational view such that it has a closed cross section (see FIGS. 8 and 9, particularly).

The rear cross member 4 interconnects rear end portions of the right-and-left side members 2. Respective end portions of the rear cross member 4 extend slightly outward, in the vehicle width direction, from the respective rear end portions of the side members 2, and located at a higher level than the rear end portions of the side members 2. The level of the both end portions of the front cross member 3 is almost equal to the level of the both end portions of the rear cross member 4 (see FIGS. 6 and 7, particularly). Herein, the connecting of the brackets 5 and the rear cross member 4 to the side members 2 or the connecting of the brackets 5 to the front cross member 3 are conducted by welding or the like, for example. Reference character 6 illustrated in the figures denotes a small and light plate-shaped reinforcing bracket.

As shown in FIGS. 1-4, the sub frame 1 suspends a wheel support member 16, which can rotatably supports a wheel W via five suspension links 11-15. These suspension links 11-15 of the present embodiment comprise three lower links 11-13 which are located below a center of the wheel W and two upper links 14, 15 which are located above the center of the wheel W. Herein, the lower links 11, 13 and the upper link 14 extend substantially in the vehicle width direction, whereas the lower link 12 and the upper link 15 extend obliquely relative to the vehicle width direction. The link 11 may be called "a front lower lateral link," the link 13 may be called "a rear lower lateral link," the link 14 may be called "an upper lateral link," the link 12 may be called "a trailing link," and the link 15 may be called "a leading link." Further, a suspension damper 17 is coupled to the wheel support member 16 at its lower end portion.

At the sub frame 1 are provided some attachment portions for attaching respective inward end portions of the five suspension links 11-15. First, a central attachment portion 21 is provided at a lower position of the connecting bracket 5 which is an interconnection portion between the side member 2 and the front cross member 3. The lower link (front lower lateral link) 11 which is located at the center among the three lower links 11-13 is attached to the central attachment portion 21.

The connecting bracket 5 of the present embodiment is made of a metal plate which is formed such that the connecting bracket 5 has a closed cross section, an outward end portion of which is comprised of a pair of flange portions 5a which open outward in the vehicle width direction. The pair of flange portions 5a of the connecting bracket 5 constitute the above-described central attachment portion 21 such that a vehicle-body side end portion of the lower link (front lower lateral link) 11 is supported between the pair of flange portions 5a (see FIG. 8, particularly).

Further, a front attachment portion 22 for attaching the lower link (trailing link) 12 is provided at a front portion of the side member 2 which is located in front of the connecting bracket 5. Additionally, a rear attachment portion 23 for attaching the lower link (rear lower lateral link) 13 is provided at a rear portion of the side member 2 which is located in back of the connecting bracket 5.

Moreover, a front upper attachment portion 24 for attaching the upper link (upper lateral link) 14 is provided at the both end portions of the front cross member 3. A rear upper attachment portion 25 for attaching the upper link (leading link) 15 is provided at the both end portions of the rear cross member 4. Positions of attaching the five links 11-15 to the sub frame 1 are illustrated by using black circles in FIG. 4.

The sub frame 1 is assembled to a vehicle-body rear portion from below in a state in which the wheel support members 16 are suspended via the suspension links 11-15 and the suspension dampers 17 are connected to the wheel support members 16 as shown in FIGS. 1-4. The connecting of the sub frame 1 to the vehicle body is conducted at in total six points of the front end portions of the pair of right-and-left side members 2, the both end portions of the front cross member 3, and the both end portions of the rear cross member 4. The six attaching points are provided at a rear frame which is a high-rigidity member of the vehicle body. The six attaching points of the sub frame 1 to the vehicle body are illustrated by using black stars in FIG. 4. Further, a vehicle-compartment floor portion is denoted by reference character 31, a rear panel portion is denoted by reference character 33, and a kick-up portion which extends vertically is denoted by reference character 32.

Next, the attaching of the sub frame 1 with the assembled suspension components which is shown in FIGS. 1-4 to the vehicle body will be described. First, a structural example of the vehicle-body rear portion will be described referring to FIG. 11 and others. In the present embodiment, the vehicle body is for an open car, more specifically for the one having right-and-left two seats.

Figure 11:
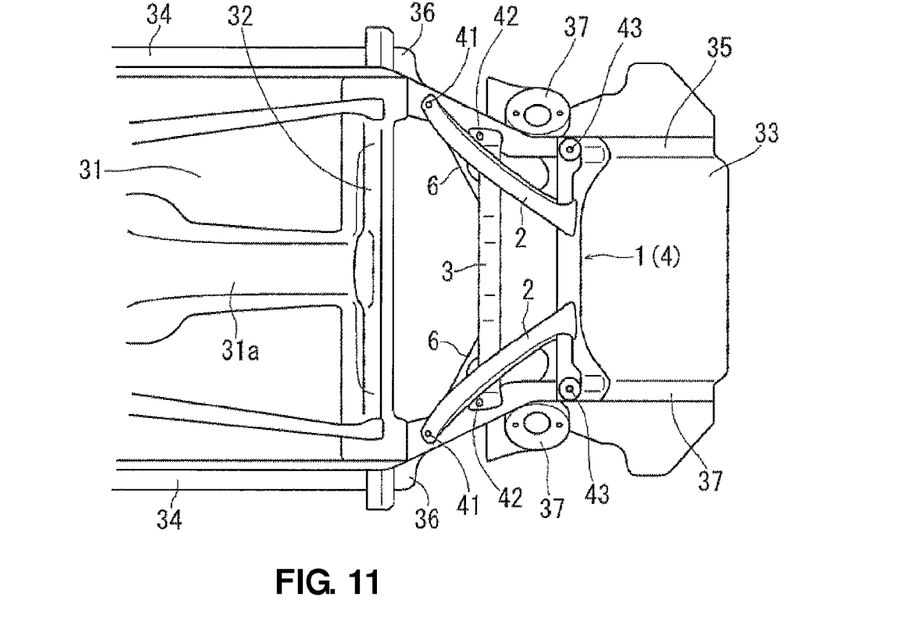
FIG. 11 is a bottom view of a vehicle-body rear portion to which the sub frame structure shown in FIG. 5 is attached, when viewed from below.
Figure 12:
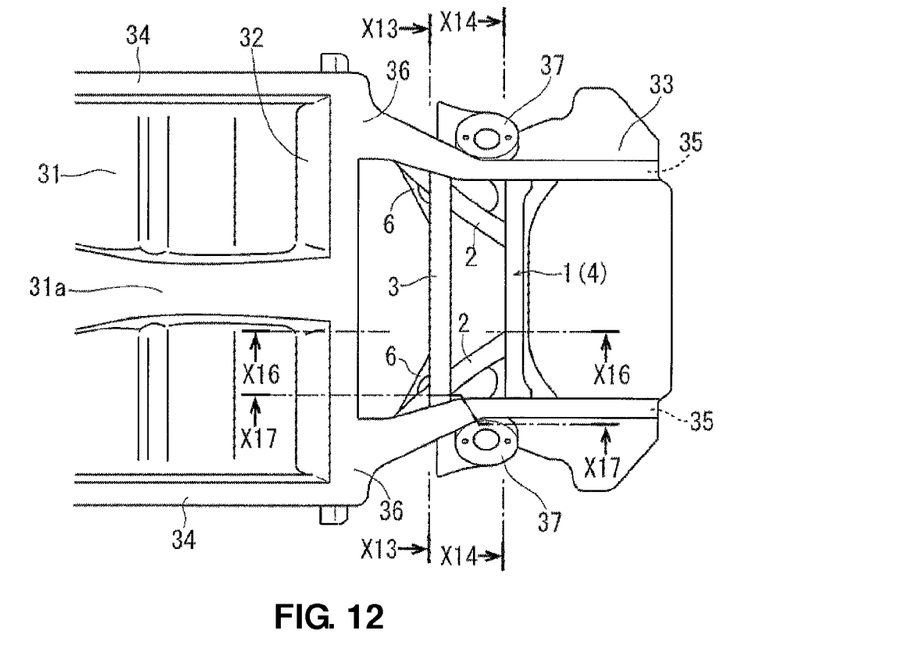
FIG. 12 is an upper view of the vehicle-body rear portion to which the sub frame structure shown in FIG. 5 is attached, when viewed from above, in which a rear floor panel near the sub frame structure is partially cut off.

The vehicle body comprises a vehicle floor which includes a vehicle-compartment floor portion 31 which is provided at a lower level, a kick-up portion 32 which rises upward from a rear end of the vehicle-compartment floor portion 31, and a rear panel portion 33 which extends rearward from an upper end of the kick-up portion 32. Herein, a tunnel portion 31a which protrudes upward and extends longitudinally is formed at a central portion, in the vehicle width direction, of the vehicle-compartment floor 31, and this tunnel portion 31a extends up to the kink up portion 32.

Outward end portions, in the vehicle width direction, of the vehicle-compartment floor portion 31 are connected to a pair of right-and-left side sills 34, as strength members, which extend in the vehicle longitudinal direction and have a closed cross section. A pair of right-and-left rear frames (rear side frames) 35 which extend in the vehicle longitudinal direction are joined to a lower face of the rear panel portion 33. The rear frame 35 constitutes a strength member having a closed cross section, cooperating with the rear panel portion 33. The rear frame 35 is configured such that its front portion curves outward in the vehicle width direction gradually and its front end connects to the side sill 34. Herein, a connection portion between the side sill 34 and the rear frame 35 is comprised of a torque box portion 36 which has a large closed cross section.

Figure 13:
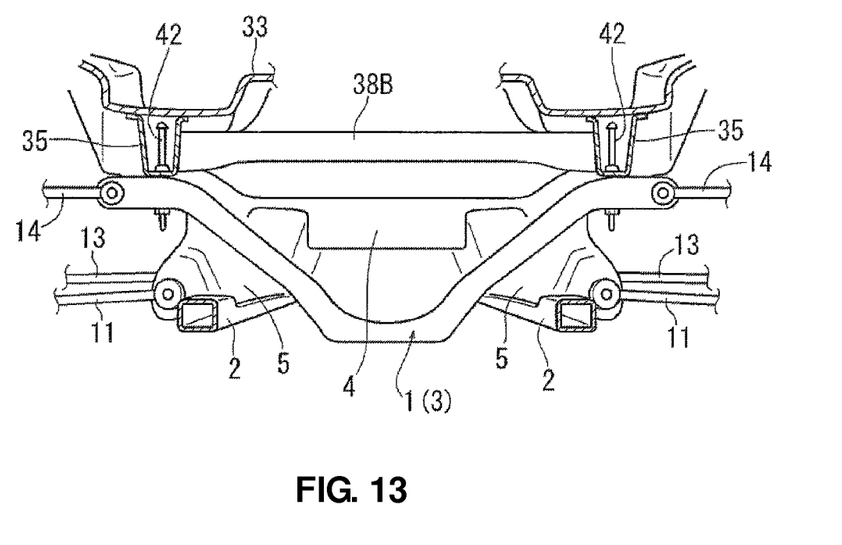
FIG. 13 is a sectional view taken along line X13-X13 of FIG. 2.
Figure 14:
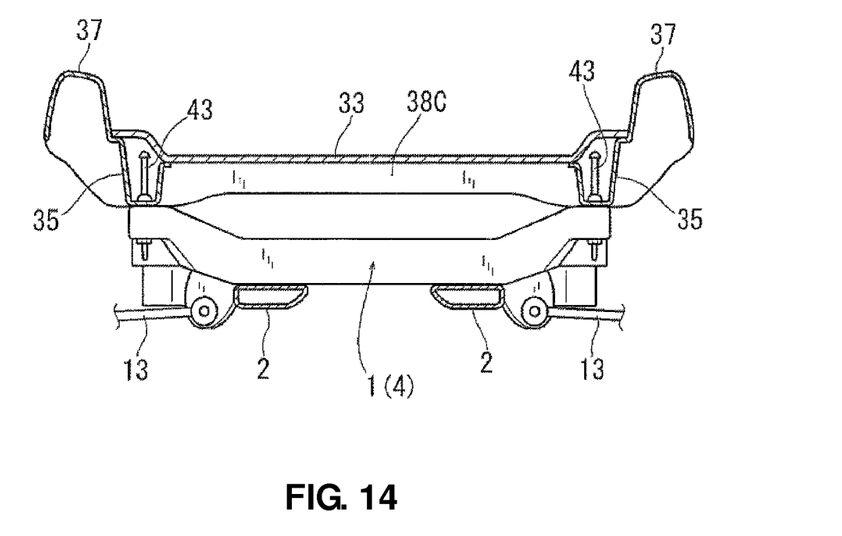
FIG. 14 is a sectional view taken along line X14-X14 of FIG. 2.

Suspension tower portions 37 are formed on the outward side of the rear panel portion 33. Upper end portions of the suspension dampers 17 are coupled to the suspension tower portions 37. Further, the right-and-left rear frames 35 (their inward side faces) are interconnected by some cross members which are joined to the lower face of the rear panel portion 33. More specifically, these cross members include at least cross members 38B, 38C (see FIGS. 13 and 14) which are arranged so as to overlap the front cross member 3 and the rear cross member 4 vertically, respectively, and a cross member 38A which is arranged near the border of the kick-up portion 32 and the rear panel portion 33. Thus, the cross members 38B, 38C are arranged so as to correspond to the connecting positions where the sub frame 1 is attached to the vehicle body, so that the rigidity of the vehicle body where the sub frame 1 is attached to the vehicle body can be increased greatly.

The sub frame 1 shown in FIGS. 1-4 is connected to the lower faces of the front end portions of the rear frames 35 via fixing means 41 at the front end portions of the side members 2 (see FIG. 11, particularly). The both end portions of the front cross member 3 are connected to the lower faces of the rear frames 35 via fixing means 42 (see FIGS. 11 and 13, particularly). Further, the both end portions of the rear cross member 4 are connected to the lower faces of the rear frames 35 via fixing means 43 (see FIGS. 11 and 14, particularly). The upper end portions of the suspension dumpers 17 are connected to the suspension tower portions 37. In the present embodiment, the connecting of the sub frame 1 to the vehicle body via the fixing means 41-43 is comprised of direct connecting without a resilient member, such as rubber. Thereby, the strength of the above-described connection can be increased, so that the responsibility of the vehicle can be improved and the vehicle-body rigidity can be further increased.

Figure 16:
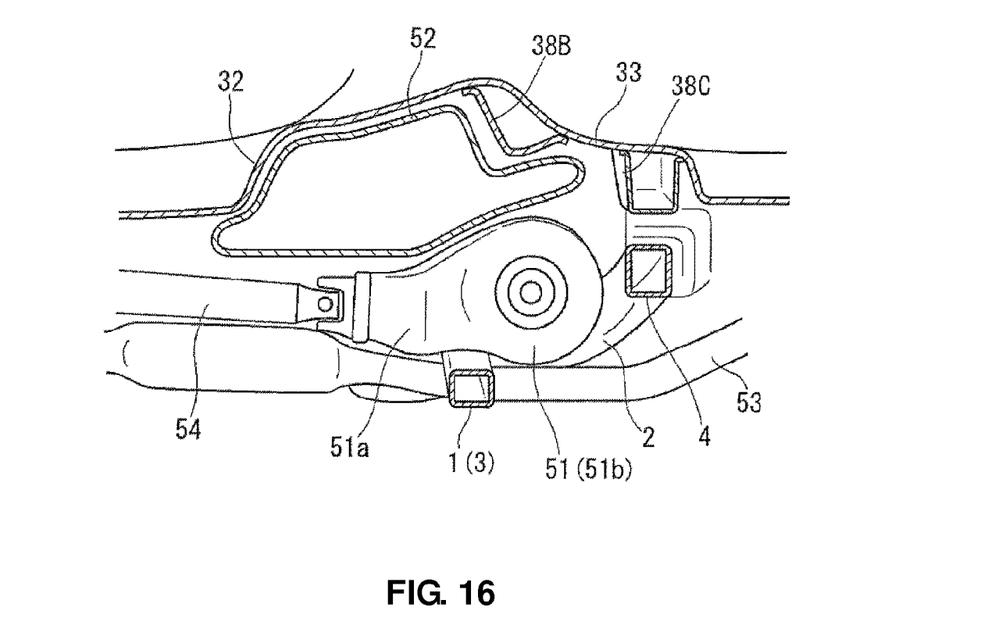
FIG. 16 is a sectional view taken along line X16-X16 of FIG. 12.
Figure 17:
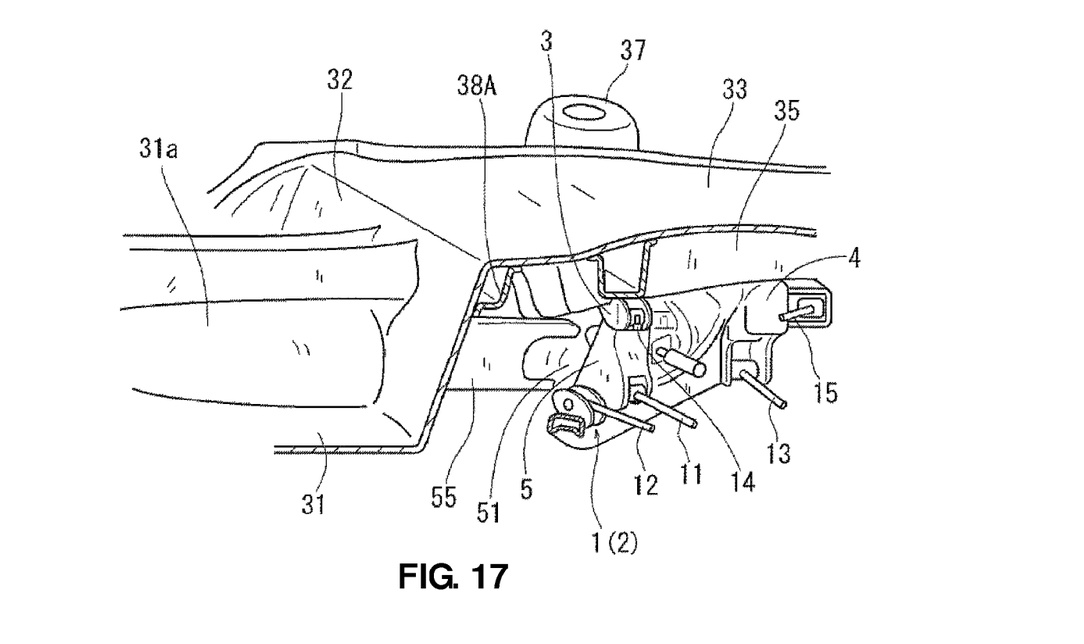
FIG. 17 is a sectional view taken along line X17-X17 of FIG. 12.
Figure 18:
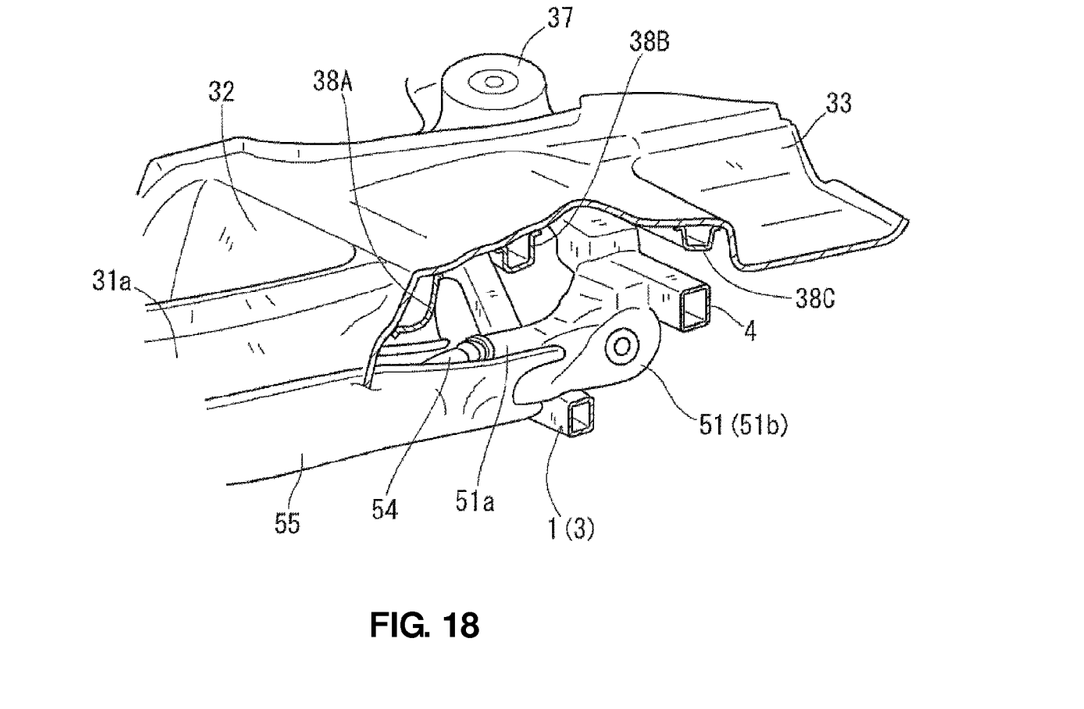
FIG. 18 is a sectional perspective view of the vehicle-body rear portion at a position which is located slightly inward in a vehicle width direction, compared with the position shown in FIG. 5.

As shown in FIGS. 16-18, the automotive vehicle of the present embodiment is a rear-wheel drive car in which rear wheels are driven only, and a differential gear box 51 is provided at the vehicle-body rear portion. The differential gear box 51 is configured such that its front end portion 51a (rotation input portion) is located above the front cross member 3 and a gear case box 51b including differential gears is arranged in a space between the front cross member 3 and the rear cross member 4. A fuel tank 52 is provided above the differential gear box 51 (see FIG. 16). In FIG. 16, reference character 53 denotes an exhaust pipe and reference character 54 denotes a propeller shaft. Reference character 55 in FIGS. 17 and 18 denotes a power plant frame.

Herein, an external force from the wheel (rear wheel) supported at the wheel support member 16 acts on the three lower links 11-13 during the vehicle turning or the like. In this case, the relatively large external force tends to act on the centrally-positioned lower link (front lower lateral link) 11 which is arranged the closest to the center of the wheel. The external force inputted to the lower link (front lower lateral link) 11 can be received stably at a properly-high rigidity portion of the central attachment portion 21 provided at the interconnection portion between the side member 2 and front cross member 3. Further, the external force inputted to the central attachment portion 21 via the lower link (front lower lateral link) 11 can be dispersed effectively to the side member 2 and the front cross member 3. Since the lower links 12, 13 are supported at the portions of the side member 2 which are close to the connection portions of the side member 2 to the vehicle body, the support rigidity of these links 12, 13 is properly high. Thus, the link support rigidity of the lower links 11-13 can be ensured properly.

The attachment portions for the upper links 14, 15 of the sub frame 1 are provided at the front cross member 3 and the rear cross member 4 which have the high rigidity, respectively, so that the support rigidity of the upper links 14, 15 can be ensured properly as well. Further, since it may not be necessary to provide the sub frame 1 with any reinforcing member, such as a large-sized brace member, which is additionally provided for connection to the vehicle body, the above-described sub frame structure can be superior in the light weight.

The front cross member 3 formed in substantially the V shape as a whole constitutes a triangular-shaped truss structure together with the vehicle floor as illustrated by a one-dotted broken line in FIG. 3, so that the rigidity of the connection portions of the side frame 1 to the vehicle body can be greatly increased. The right-and-left side members 2 are arranged obliquely relative to the vehicle longitudinal direction in the plan view such that a distance between their both front end portions is greater than that between their both rear end portions. Thus, the side members 2, the rear frames 35, and the rear cross member 4 constitute a truss structure (see FIG. 1, particularly), so that the rigidity of this portion can be greatly increased.

Figure 15:
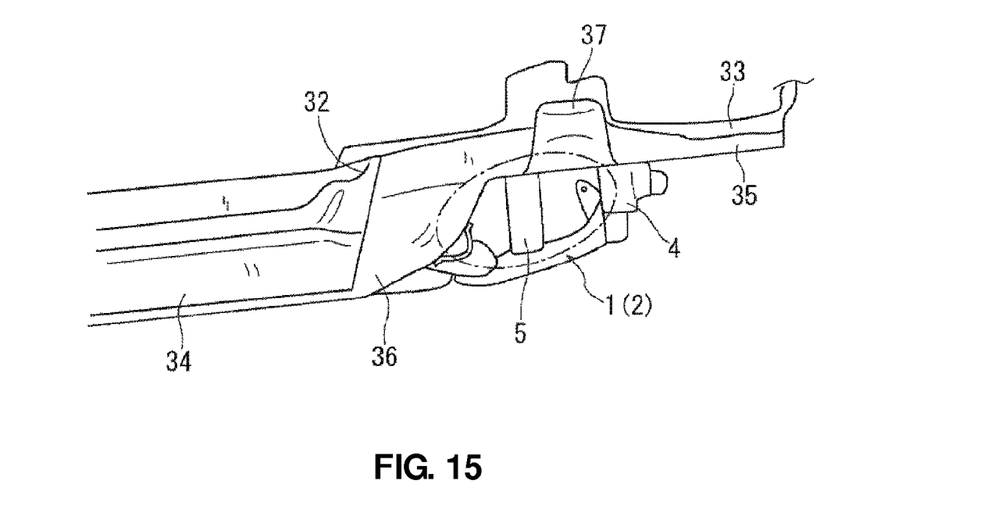
FIG. 15 is a left side view of the vehicle-body rear portion to which the sub frame structure shown in FIG. 5 is attached.

In the side view of FIG. 15, the vehicle floor (the kick-up portion 32 and the rear panel portion 33) and the sub frame 1 constitute a properly-high rigidity portion which is enclosed in an oval shape by a one-dotted broken line. Herein, since the connecting bracket 5 is arranged to extend vertically, passing through substantially the center of this oval-shaped area, it can be effectively prevented that this oval-shaped area crushes and deforms improperly, so that the rigidity of the vehicle body around the sub frame 1 attached to the vehicle body can be increased properly.

The present invention should not be limited to the above-described embodiment, and any other modifications or improvements may be applied within the scope of a spirit of the present invention. For example, the rear cross member 4 may be removed, and in this case, the rear end portions of the side members 2 can be connected to the vehicle body directly. Further, in order to maintain the state in a state in which the suspension related components are assembled prior to the attaching to the vehicle body, any jigs for temporarily interconnecting the lower faces of the rear end portions of the pair of side members 2 may be used, for example, and the jigs may be removed after the sub frame 1 has been attached to the vehicle body. Also, in the case of the rear cross member 4 being removed, the rear end portions of the pair of side members 2 may be connected to the cross member (38C) which is located near the position corresponding to the rear cross member 4. When attaching the sub frame 1 to the vehicle body, some resilient members, such as rubber, may be applied between them (for improving the ride comfort and vibrations). The automotive vehicle may be a four-wheel drive car in which both front and rear wheels are driven, or a front-drive car in which only front wheels are driven. A full-open type of car which can take a mode in which there is no roof, or a semi-open type of car in which a longitudinal part of a roof does not exist over its entire width may be applied as the above-described open car type of automotive vehicle. Of course, the application of the present invention is not limited to the open car type of automotive vehicle. Moreover, the type of suspension device suspended at the side frame 1 is not limited to the multilink type, but any type may be applied. For example, a double wishbone type having lower and upper arms, a strut type having the above-described suspension damper 37 which is configured to function as an upper arm as well, and others can be applied.

What is claimed is:

1. A sub frame structure of an automotive vehicle, in which a sub frame to support a suspension device for a wheel at a vehicle body is connected to a pair of right-and-left rear frames, via fixing means, which have a closed cross section and extend in a vehicle longitudinal direction below a vehicle floor which includes a vehicle-compartment floor portion, a kick-up portion rising upward from a rear end of the vehicle-compartment floor portion, and a rear panel portion extending rearward from an upper end of the kick-up portion, the sub frame comprising:

a front cross member extending in a vehicle width direction and connected to the pair of rear frames located below the rear panel portion via fixing means at right-and-left both end portions thereof, the front cross member having a central portion which is configured to project downward in substantially a V shape in an elevational view;

a rear cross member extending in the vehicle width direction at a position located in back of said front cross member and connected to the pair of rear frames located below the rear panel portion via fixing means at right-and-left both end portions thereof;

a pair of right-and-left side members extending substantially in the vehicle longitudinal direction below said front cross member, respective front end portions of which are connected to the pair of rear frames located below around the kick-up portion via fixing means and respective rear end portions of which are joined to said rear cross member; and a pair of right-and-left connecting brackets extending substantially in a vehicle vertical direction and interconnecting respective substantially central portions, in the vehicle longitudinal direction, of said pair of side members and right-and-left slant portions of said front cross member which form part of said V-shaped central portion and are located above the pair of side members, wherein at said pair of connecting brackets are respectively provided a pair of attachment portions for attaching a specified link among plural suspension links constituting said suspension device which is arranged the closest to a center of the wheel.

2. The sub frame structure of an automotive vehicle of claim 1, wherein said connecting bracket is made of a metal plate which is formed such that the connecting bracket has a closed cross section, an outward end portion of which is comprised of a pair of flange portions which open outward in the vehicle width direction, and said pair of flange portions constitute said attachment portion such that a vehicle-body side end portion of said specified link is supported between the pair of flange portions.

3. The sub frame structure of an automotive vehicle of claim 1, wherein said connecting bracket is configured to have substantially a triangular shape in the elevational view.

4. The sub frame structure of an automotive vehicle of claim 1, wherein said pair of side members are arranged obliquely relative to the vehicle longitudinal direction in a plan view such that a distance between the both front end portions thereof is greater than that between the both rear end portions thereof.

5. The sub frame structure of an automotive vehicle of claim 1, wherein said side member is configured to curve in a side view, projecting downward.

6. The sub frame structure of an automotive vehicle of claim 1, wherein said connecting of the both end portions of said front cross member, the both end portions of said rear cross member, and the respective front end portions of said pair of side members to the pair of rear frames is comprised of direct connecting without a resilient member.

7. The sub frame structure of an automotive vehicle of claim 1, wherein said suspension device is a multilink rear suspension device equipped with five suspension links for a single rear wheel, and said attachment portion provided at the connecting bracket is provided for attaching a front lower lateral link which is a forward-positioned link between two lower lateral links which are arranged below the center of the wheel, extending substantially in the vehicle width direction.

8. The sub frame structure of an automotive vehicle of claim 7, wherein an attachment portion for attaching a rear lower lateral link which is a rearward-positioned link between said two lower lateral links is provided at a portion of said side member which is located near said rear end portion joined to said rear cross member.

9. The sub frame structure of an automotive vehicle of claim 7, wherein an attachment portion for attaching a trailing link among the five suspension links which is arranged below the center of the wheel, extending obliquely relative to the vehicle width direction, is provided at a portion of said side member which is located near said front end portion of the side member.

10. The sub frame structure of an automotive vehicle of claim 7, wherein an attachment portion for attaching an upper lateral link among the five suspension links which is arranged above the center of the wheel, extending substantially in the vehicle width direction, is provided at said end portion of said front cross member.

11. The sub frame structure of an automotive vehicle of claim 7, wherein an attachment portion for attaching a leading link among the five suspension links which is arranged above the center of the wheel, extending obliquely relative to the vehicle width direction, is provided at said end portion of said rear cross member.

12. The sub frame structure of an automotive vehicle of claim 1, wherein said suspension device is a multilink rear suspension device equipped with five suspension links for a single rear wheel, said attachment portion provided at the connecting bracket is provided for attaching a front lower lateral link which is a forward-positioned link between two lower lateral links which are arranged below the center of the wheel, extending substantially in the vehicle width direction, an attachment portion for attaching a rear lower lateral link which is a rearward-positioned link between said two lower lateral links is provided at a portion of said side member which is located near said rear end portion joined to said rear cross member, an attachment portion for attaching a trailing link among the five suspension links which is arranged below the center of the wheel, extending obliquely relative to the vehicle width direction, is provided at a portion of said side member which is located near said front end portion of the side member, an attachment portion for attaching an upper lateral link among the five suspension links which is arranged above the center of the wheel, extending substantially in the vehicle width direction, is provided at said end portion of said front cross member, and an attachment portion for attaching a leading link among the five suspension links which is arranged above the center of the wheel, extending obliquely relative to the vehicle width direction, is provided at said end portion of said rear cross member.

13. The sub frame structure of an automotive vehicle of claim 1, wherein said suspension device is a rear suspension device for suspending a rear wheel as a drive wheel, and a differential gear box which constitutes part of a drive device of driving the rear wheel is arranged in a space above said V-shaped central portion of the front cross member.

14. The sub frame structure of an automotive vehicle of claim 1, wherein said sub frame is applied to an open car automotive vehicle.

* * * * *